US011299357B1

United States Patent
Daun et al.

(10) Patent No.: US 11,299,357 B1
(45) Date of Patent: Apr. 12, 2022

(54) VACUUM CONVEYOR SYSTEM FOR REMOVING ARTICLES, SUCH AS CONTAINERS, FROM TRAYS

(71) Applicant: Arrowhead Systems, Inc., Oshkosh, WI (US)

(72) Inventors: Kenneth J. Daun, Green Lake, WI (US); Mason A. Lee, Oshkosh, WI (US); Michael J Albright, Oshkosh, WI (US)

(73) Assignee: Arrowhead Systems, Inc., Oshkosh, WI (US)

( * ) Notice: Subject to any disclaimer, the term of this patent is extended or adjusted under 35 U.S.C. 154(b) by 0 days.

(21) Appl. No.: 17/216,921

(22) Filed: Mar. 30, 2021

Related U.S. Application Data

(60) Provisional application No. 63/013,011, filed on Apr. 21, 2020.

(51) Int. Cl.
*B65G 47/91* (2006.01)
*B65G 15/58* (2006.01)
*B65G 15/22* (2006.01)
*B65G 15/12* (2006.01)
*B65G 47/52* (2006.01)
*B65G 47/68* (2006.01)

(52) U.S. Cl.
CPC .......... *B65G 47/912* (2013.01); *B65G 15/12* (2013.01); *B65G 15/22* (2013.01); *B65G 15/58* (2013.01); *B65G 47/52* (2013.01); *B65G 47/683* (2013.01)

(58) Field of Classification Search
CPC .... B65G 15/58; B65G 47/912; B65G 47/683; B65G 15/12; B65G 15/14; B65G 15/16; B65G 15/22; B65G 15/24; B65G 47/56; B65G 47/57

USPC .............................................. 198/438, 689.1
See application file for complete search history.

(56) References Cited

U.S. PATENT DOCUMENTS

| 2,975,920 A | 3/1961 | Reed et al. |
| 3,099,360 A | 7/1963 | Petersen et al. |
| 3,433,375 A | 3/1969 | Jones |
| 3,477,558 A | 11/1969 | Fleischauer |

(Continued)

FOREIGN PATENT DOCUMENTS

| EP | 0638478 | 2/1995 | |
| EP | 1084968 A1 * | 3/2001 | ........... B65G 47/841 |

*Primary Examiner* — Mark A Deuble
(74) *Attorney, Agent, or Firm* — Boyle Fredrickson S.C.

(57) ABSTRACT

A transfer system for removing articles from trays includes a supply conveyor and a discharge conveyor A separation and transfer arrangement, including an article transport member, is interposed between a downstream end of the supply conveyor and an upstream end of the article discharge conveyor. The article transport member. Which may be a vacuum conveyor, acts on an upper end defined by each article to suspend the articles therebelow, and advances the articles from the downstream end of the supply conveyor to the upstream end of the discharge conveyor, which are at generally the same elevation. A tray transport member extends from the downstream end of the supply conveyor, and advances the trays downwardly in an upstream-to-downstream direction so that the trays are positioned below the upstream end of the discharge conveyor as the articles are deposited on the upstream end of the discharge conveyor by the article transport member.

14 Claims, 6 Drawing Sheets

(56) References Cited

U.S. PATENT DOCUMENTS

| | | | | |
|---|---|---|---|---|
| 3,958,683 A | * | 5/1976 | Schregenberger | B65G 47/57 |
| | | | | 198/431 |
| 4,136,767 A | | 1/1979 | Sarovich | |
| 4,560,060 A | | 12/1985 | Lenhart | |
| 5,048,696 A | * | 9/1991 | Evans | B65G 47/71 |
| | | | | 209/552 |
| 6,868,958 B2 | * | 3/2005 | Betti | B26D 3/16 |
| | | | | 198/418.7 |

* cited by examiner

VACUUM CONVEYOR SYSTEM FOR REMOVING ARTICLES, SUCH AS CONTAINERS, FROM TRAYS

CROSS-REFERENCE TO RELATED APPLICATION

This application claims the benefit of U.S. provisional patent application Ser. No. 63/013,011 filed Apr. 21, 2020, the entire disclosure of which is hereby incorporated by reference.

BACKGROUND AND SUMMARY

The present invention is directed to a system for removing articles or objects, such as containers, from trays, such as for supplying such articles or objects to a mass flow conveyor for transport to a downstream location.

In certain material handling applications, articles destined to be advanced on a mass flow conveyor are supplied in containers or trays. For example, in a production system in which liquids or other flowable substances are to be packaged in containers, it is common for the containers to be shipped to a filling facility in palletized trays. The trays of containers must then be depalletized and the containers removed from the trays, so that the containers can ultimately be supplied to the mass flow conveyor.

The present invention relates to a system for removing articles, such as containers, from trays after the trays have been depalletized.

In accordance with the present invention, a transfer system for removing articles from trays includes a supply conveyor defining a downstream end, which is configured to convey articles in trays toward the downstream end. A discharge conveyor having an upstream end is spaced in a downstream direction from the downstream end of the supply conveyor. A separation and transfer arrangement is interposed between the downstream end of the supply conveyor and the upstream end of the article discharge conveyor. The separation and transfer arrangement includes an article transport member located above the articles at the downstream end of the supply conveyor, which acts on an upper end defined by each article to suspend the articles therebelow. The article transport member advances the articles from the downstream end of the supply conveyor and deposits the articles on the upstream end of the discharge conveyor. The downstream end of the supply conveyor and the upstream end of the discharge conveyor are at generally the same elevation.

The transfer system further includes a tray transport member extending from the downstream end of the supply conveyor. The tray transport member is configured to advance the trays downwardly in an upstream-to-downstream direction so that the trays are positioned below the upstream end of the discharge conveyor as the articles are deposited on the upstream end of the discharge conveyor by the article transport member.

Representatively, the article transport member may be in the form of a vacuum conveyor that includes a vacuum conveyor belt having a lower run that overlaps the downstream end of the article supply conveyor and also overlaps the upstream end of the discharge conveyor. The vacuum conveyor may also include a vacuum chamber, and the vacuum conveyor belt defines an inner surface exposed to an interior defined by the vacuum chamber and exposed to negative air pressure therein, and a downwardly facing outer surface. The vacuum conveyor belt includes passages that communicate negative air pressure from the inner surface to the outer surface, such that the negative air pressure communicated to the outer surface of the vacuum conveyor belt applies suction to the upper ends of the articles to suspend the articles from the vacuum conveyor belt.

The tray transport member may be in the form of a tray transport conveyor having a downward incline in an upstream-to-downstream direction, and which is oriented such that a space is defined between the tray transport member and the upstream end of the discharge conveyor through which the trays pass after the articles have been removed from the trays. The tray transport conveyor defines an upstream end located adjacent the downstream end of the supply conveyor, and a downstream end located below the upstream end of the discharge conveyor. A tray discharge conveyor is located below the discharge conveyor and configured to receive trays discharged by the tray transport conveyor.

The supply conveyor may be configured to advance the articles in an upstream-to-downstream linear direction toward the downstream end of the supply conveyor, and the discharge conveyor may likewise be configured to advance the articles in the upstream-to-downstream linear direction away from the upstream end of the discharge conveyor. The article transport member is configured to advance the articles in the upstream-to-downstream linear direction between the downstream end of the supply conveyor and the upstream end of the discharge conveyor.

The present invention also contemplates a method of transferring articles in trays onto a mass flow conveyor, substantially in accordance with the foregoing summary.

Other aspects, features and advantages of the invention will become apparent to those skilled in the art from the following detailed description and accompanying drawings. It should be understood, however, that the detailed description and specific examples, while indicating certain embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements can be several views, and in which.

Figure 1:
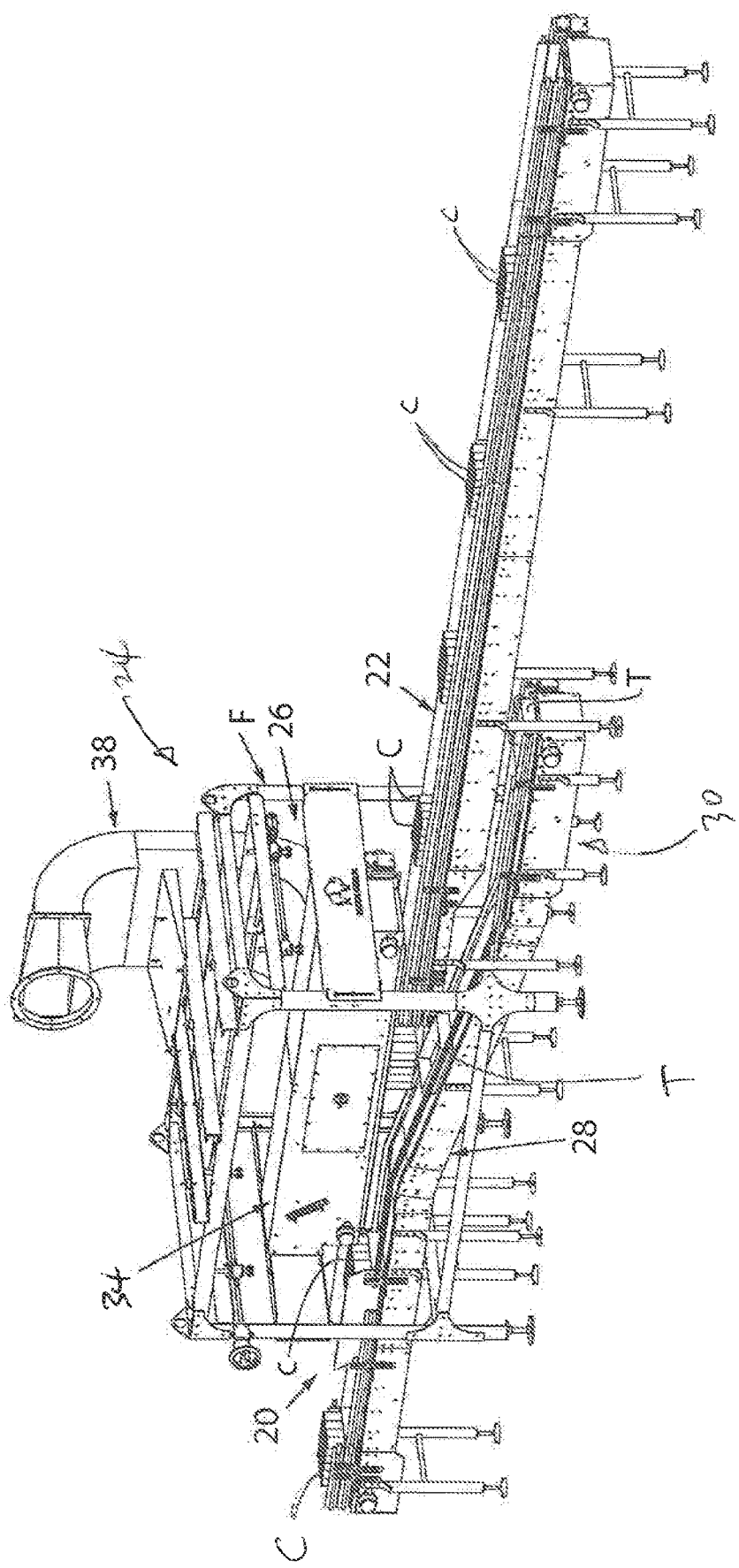
FIG. 1 is an isometric view of a transfer system for removing articles from trays, in accordance with the present invention.
Figure 2:
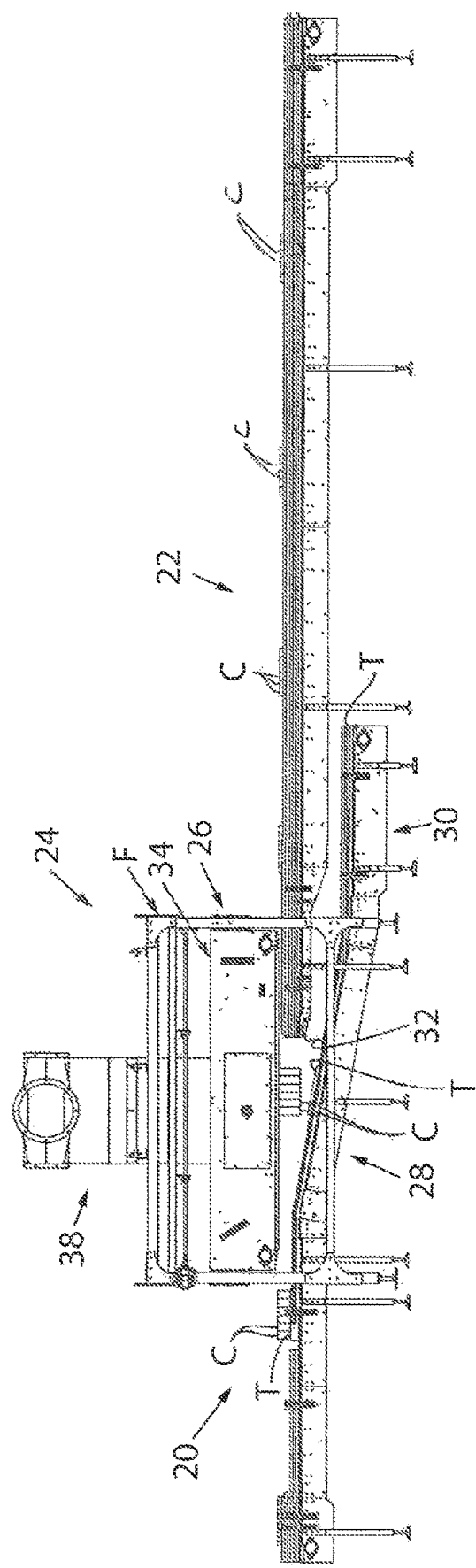
FIG. 2 is an elevation view of the transfer system of FIG. 1.

In describing the embodiments of the invention which are illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the words "connected," "attached," or terms similar thereto are often used. They are not limited to direct connection or attachment, but include connection or attachment to other elements where such connection or attachment is recognized as being equivalent by those skilled in the art.

DETAILED DESCRIPTION

The various features and advantageous details of the subject matter disclosed herein are explained more fully with reference to the non-limiting embodiments described in detail in the following description.

Referring to the following description in which like reference numerals represent like parts throughout the disclosure, a system in accordance with the present invention for removing articles or objects, such as containers, from trays or other carriers generally includes a supply conveyor 20 and a container discharge conveyor 22. A container removal or tray stripping system, shown generally at 24, is positioned between the downstream end of supply conveyor 20 and the upstream end of container discharge conveyor 22.

Both the supply conveyor 20 and the discharge conveyor 22 may be any suitable type of conveyor, such as a belt conveyor, slat conveyor, tabletop conveyor, etc., that is capable of moving objects in an upstream-to-downstream direction. In a representative application, the supply conveyor 20 is adapted to convey containers C that are positioned within carriers or trays T, wherein the containers C are destined to be removed from the trays T for a subsequent processing operation such as may be carried out in a canning, filling or packaging line. The container discharge conveyor 22 is a mass flow conveyor that is adapted to convey the containers C in a downstream direction after the containers C have been removed from the trays T.

The container removal system 24 generally includes an upper vacuum conveyor 26 and a lower tray transport conveyor 28.

The lower tray transport conveyor 28 may be any suitable type of conveyor, such as a belt conveyor, slat conveyor, tabletop conveyor, etc., and defines an upstream end that is contiguous to, and that is located at the same elevation as, the downstream end of the supply conveyor 20. The lower tray transport conveyor 28 is inclined downwardly in an upstream-to-downstream direction, such that its downstream end is located at a lower elevation than its upstream end. With this configuration, the tray transport conveyor 28 extends below and underlies the upstream end of the container discharge conveyor 22.

The tray removal conveyor 30 is contiguous to, and located at the same elevation as, the downstream end of the tray transport conveyor 28. A gap or space 32 is defined between the upwardly facing surface of the tray transport conveyor 28 and the underside of the upstream end of the conveying member and frame of container discharge conveyor 22. The gap or space 32 has a height sufficient to enable a tray T supported on the tray transport conveyor 28 to pass below the upstream end of the container discharge conveyor 22 as the tray T is moved in a downstream direction on the tray transport conveyor 28.

The vacuum conveyor 26 generally includes a frame assembly F to which a conveyor enclosure 34 is mounted. A vacuum conveyor assembly 36 is mounted within the conveyor enclosure 34. The conveyor enclosure 34 is vertically movable on the frame F relative to the supply conveyor 20 and container discharge conveyor 22, in a manner as is known. A vacuum supply system, shown generally at 38, is supported by the frame F above the conveyor enclosure 34. The vacuum supply system 38 functions as a source of negative air pressure that is communicated to a plenum 40 located in the interior of conveyor enclosure 34.

Figure 3:
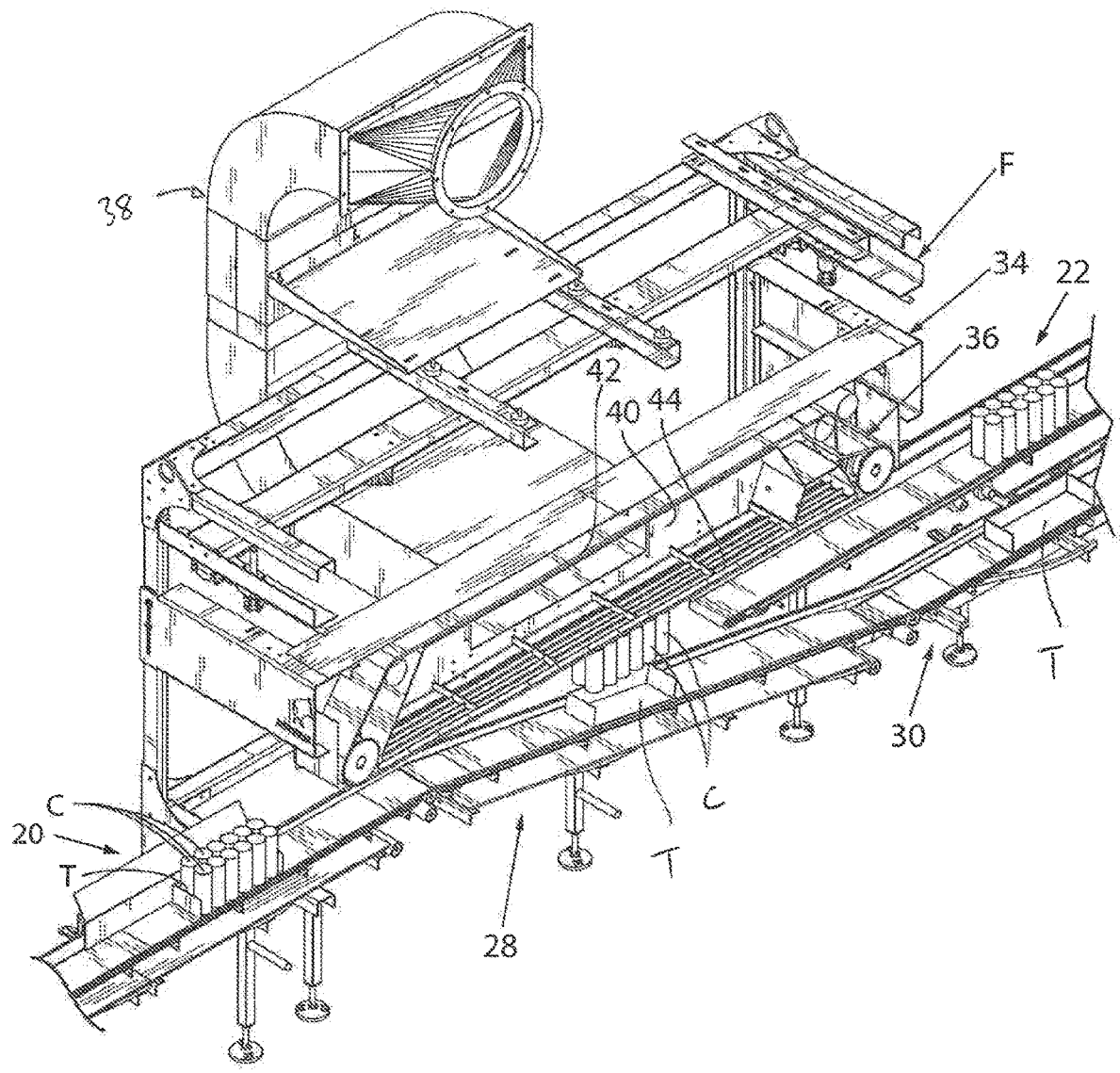
FIG. 3 is an enlarged partial isometric view, with portions in section, showing components of the transfer system of FIGS. 1 and 2.
Figure 4:
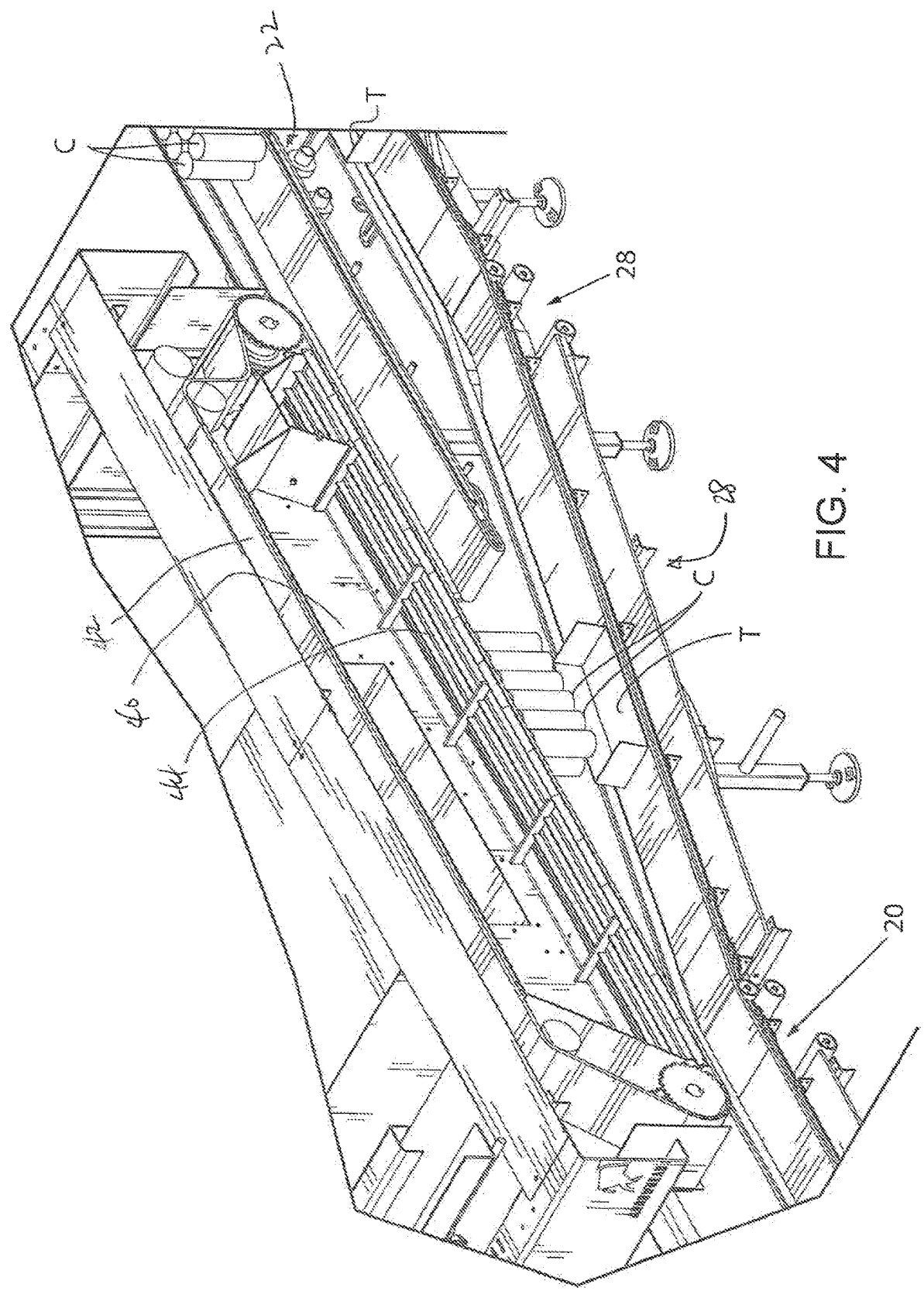
FIG. 4 is a further enlarged partial isometric view, with portions in section, showing components of the transfer system of FIGS. 1-3.
Figure 5:
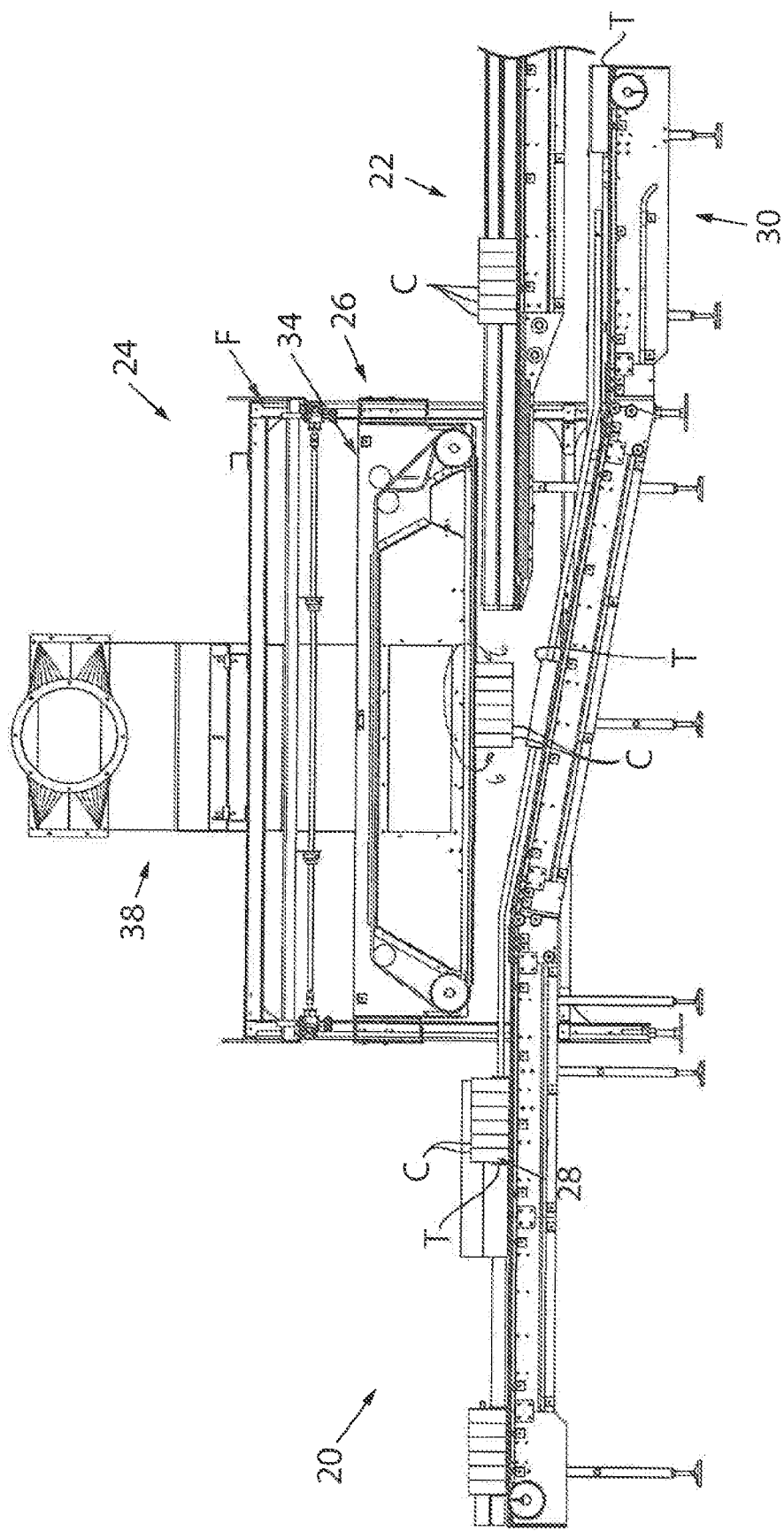
FIG. 5 is an enlarged elevation view, with portions in section, showing components of the transfer system of FIGS. 1-4.
Figure 6:
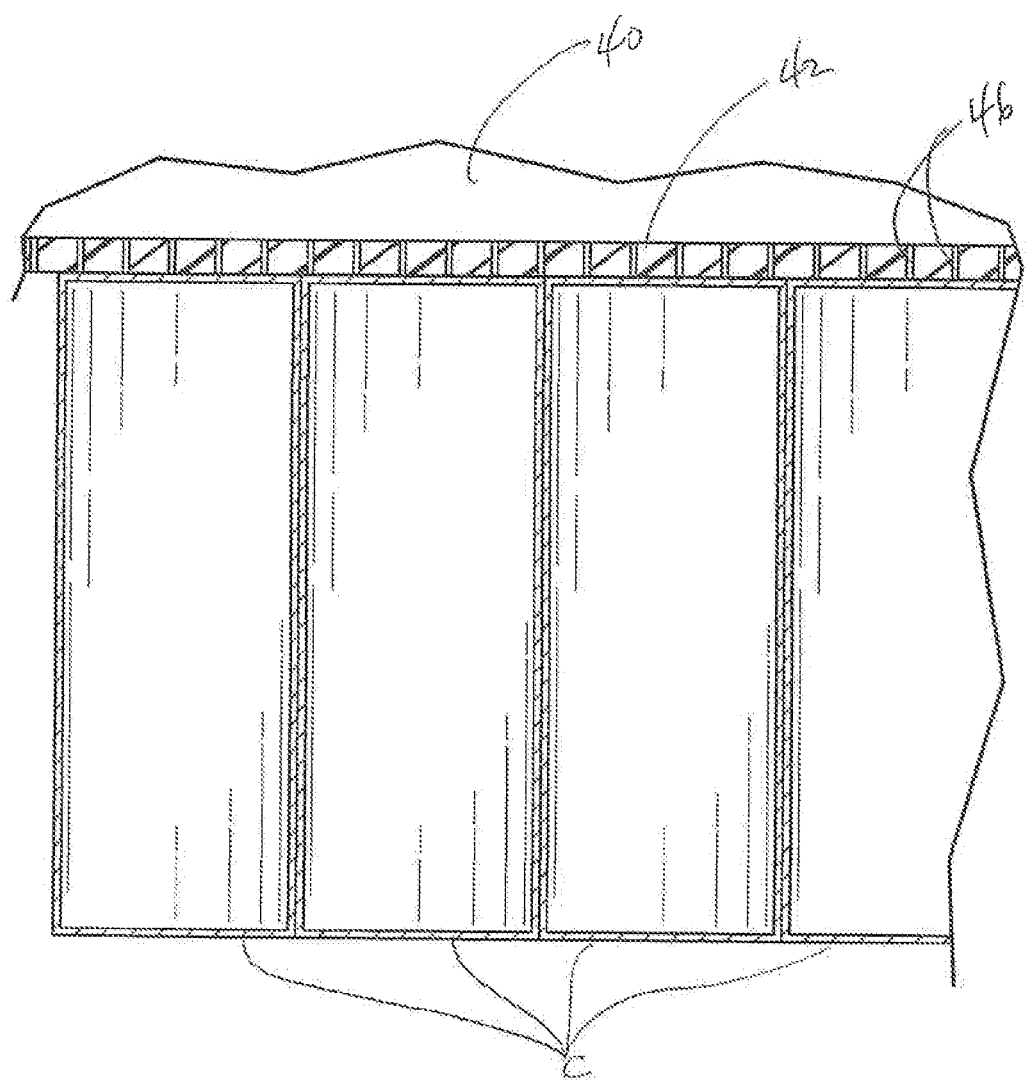
FIG. 6 is an enlarged partial section view, with reference to line 6-6 as shown in FIG. 5.

FIGS. 3, 4 and 5 are presented in partial section, which functions to illustrate the internal components of conveyor enclosure 34 as well as vacuum supply system 38. The vacuum conveyor assembly 36 contained within the conveyor enclosure 34 includes a conveyor belt or chain 42 trained about a series of rollers or pulleys, in a manner as is known. The lower run of the belt or chain 42 is located below a lower guide wall 44. The lower guide wall 44 defines the lower surface of the plenum 40, and is provided with suitable structure such as slots, perforations or other openings that enables negative air pressure from the plenum 40 to be communicated through the belt or chain 42. As shown in FIG. 6, the belt or chain 42 includes passages or perforations, shown at 46, that communicate negative air pressure from the inner surface of belt or chain 42 to its outer surface.

The downstream discharge end of the supply conveyor 20 and the upstream end of the container discharge conveyor 22 are oriented horizontally and are at generally the same elevation. The lower rim of the vacuum belt or chain 42 is also oriented horizontally at an elevation above that of supply conveyor 20 and container discharge conveyor 22 according to the height of the containers C. As noted above, the elevation of the vacuum 1:5 conveyor enclosure 34 can be adjusted to vary the elevation of the lower run of the vacuum belt or chain 42 to accommodate containers C having different heights. The lower run of the vacuum belt or chain 42 overlaps the downstream end of the supply conveyor 20 as well as the upstream end of the container discharge conveyor 22.

In operation, trays T with containers C are transported in a downstream direction on the supply conveyor 20 toward the downstream or discharge end of the supply conveyor 20. As the tray T approaches the downstream end of the supply conveyor 20, containers C are advanced below the upstream end of the lower run of vacuum belt or chain 42. As the top of each container C becomes exposed to the negative air pressure through the perforations or passages 46 of vacuum belt or chain 42, the container C is lifted off the floor of the tray T and is sucked against the underside of the vacuum belt or chain 42, so that the container C is suspended from the vacuum belt or chain 42. Each successive container C becomes similarly engaged with the underside of the vacuum belt or chain 42 as the tray T is advanced on the supply conveyor 20 so that, upon continued advancement, all of the containers C contained within the tray T are lifted off the floor of the tray T. As can be appreciated, the speed of advancement of the supply conveyor 20 and the speed up advancement of the vacuum belt or chain 42 are coordinated so that the containers C and the underlying tray T are advanced at the same rate. As advancement of the containers C and underlying tray T continues, the containers C and tray T are separated by means of gravity, air jet, mechanical rail or a combination of devices, at a location upstream of the upstream end of the container discharge conveyor 22. Continued advancement of the containers C by the vacuum belt or chain 42 of the vacuum conveyor assembly 36 results in the containers C being advanced over the upstream end of the container discharge conveyor 22. The conveying surface of the container discharge conveyor 22 is positioned at an elevation slightly below the bottoms of the containers C, so that while the containers C are suspended from the vacuum belt or chain 42 as the containers approach the downstream end of the vacuum conveyor assembly 36, there is a slight gap between the container bottoms and the conveying surface of the container discharge conveyor 22. As each container C reaches the downstream end of the vacuum conveyor assembly 36, the top of the container C passes under the downstream end of the plenum 40 so that the top of the container C is no longer exposed to the negative air pressure from the vacuum belt or chain 42. When this occurs, the container C falls by gravity onto the conveying surface of the container discharge conveyor 22, where it is supported from below. The same occurs with respect to successive containers C, which are then transported in a downstream direction by the container discharge conveyor 22 in a mass flow manner.

After the containers C have been lifted off the floor of the tray T, the tray T continues to be advanced by the tray transport conveyor 28 and is advanced in a downstream and downhill direction, passing through the gap or space 32 under the upstream end of the container discharge conveyor 22. The trays T then move onto the tray removal conveyor 30 for subsequent handling.

The container removal system 24 acts in concert with the supply conveyor 20 and the container discharge conveyor 22 to remove the containers C from the trays T in an efficient and effective manner, providing continuous advancement of the containers C and removal of the underlying trays T. The containers C are maintained at a generally constant elevation as they are supplied by the supply conveyor in the trays T and transferred by the container removal system 24 to the mass flow container discharge conveyor 22, while at the same time the underlying trays T are separated from the containers C therebelow and advanced for removal or further handling. This provides a relatively low profile and compact system for simultaneously removing the containers C from the trays T advancing the trays T for handling or disposal, and depositing the containers C onto a mass flow discharge conveyor.

While the present invention has been shown and described in connection with removing containers from trays the transferring them to a mass flow conveyor, it should be understood that the system can be used to remove objects other than containers from underlying trays, receptacles or carriers and transferring the objects to a mass flow conveyor or other transport arrangement.

In addition, while the present invention has been shown and described as employing negative air pressure for supporting the containers or other objects from above as the tray or other carrier is removed and advanced below the containers or other objects, it is understood that other systems may be employed for suspending the containers or other objects and advancing them in a downstream direction to a mass flow conveyor or other transport arrangement. Such an alternative system may, for example, employ a magnetic arrangement whereby the containers or other objects are magnetically attracted to a chain, belt or other advancement arrangement that can move the containers or other objects to a mass flow conveyor or other transport arrangement.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

What is claimed is:

1. A transfer system, comprising:
a supply conveyor defining a downstream end, wherein the supply conveyor is configured to convey articles in trays toward the downstream end, wherein each article defines a top and a bottom;
a discharge conveyor having an upstream end spaced in a downstream direction from the downstream end of the supply conveyor; and
a separation and transfer arrangement interposed between the downstream end of the supply conveyor and the upstream end of the article discharge conveyor, wherein the separation and transfer arrangement includes an article transport member located above the articles at the downstream end of the supply conveyor that acts on the upper ends of the articles to suspend the articles therebelow, wherein the article transport member advances the articles from the downstream end of the supply conveyor to the upstream end of the discharge conveyor, and wherein the transfer system further includes a tray transport member extending from the downstream end of the supply conveyor, wherein the downstream end of the supply conveyor and the upstream end of the discharge conveyor are at generally the same elevation, and wherein the tray transport member advances the trays downwardly in an upstream-to-downstream direction so that the trays are positioned below the upstream end of the discharge conveyor as the articles are deposited on the upstream end of the discharge conveyor by the article transport member.

2. The transfer system of claim 1, wherein the article transport member comprises a vacuum conveyor.

3. The transfer system of claim 2, wherein the vacuum conveyor includes a vacuum conveyor belt having a lower run that overlaps the downstream end of the article supply conveyor and also overlaps the upstream end of the discharge conveyor.

4. The transfer system of claim 3, wherein the vacuum conveyor includes a vacuum chamber, and wherein the vacuum conveyor belt defines an inner surface exposed to an interior defined by the vacuum chamber and exposed to negative air pressure therein, a downwardly facing outer surface, and passages that communicate negative air pressure from the inner surface to the outer surface, wherein the negative air pressure communicated to the outer surface of the vacuum conveyor belt applies suction to the upper ends of the articles to suspend the articles from the vacuum conveyor belt.

5. The transfer system of claim 1, wherein the tray transport member comprises a tray transport conveyor having a downward incline in an upstream-to-downstream direction, wherein a space is defined between the tray transport member and the upstream end of the discharge conveyor through which the trays pass after the articles have been removed from the trays.

6. The transfer system of claim 5, wherein the tray transport conveyor defines an upstream end located adjacent the downstream end of the supply conveyor, and a downstream end located below the upstream end of the discharge conveyor, and further comprising a tray discharge conveyor located below the discharge conveyor and configured to receive trays discharged by the tray transport conveyor.

7. The transfer system of claim 1, wherein the supply conveyor is configured to advance the articles in an upstream-to-downstream linear direction toward the downstream end of the supply conveyor, and wherein the discharge conveyor is configured to advance the articles in the upstream-to-downstream linear direction away from the upstream end of the discharge conveyor, and wherein the article transport member is configured to advance the articles in the upstream-to-downstream direction between the downstream end of the supply conveyor and the upstream end of the discharge conveyor.

8. A method of transferring articles in trays onto a mass flow conveyor, wherein each article defines a top and a bottom, comprising the steps of:
advancing the trays and articles toward a downstream end of a supply conveyor;
engaging the articles with an article transfer member interposed between the downstream end of the supply conveyor and an upstream end of the mass flow conveyor, wherein the transfer member is located above the articles and acts on the upper ends of the articles to suspend the articles therebelow, wherein the article transfer member advances the articles from the downstream end of the supply conveyor and deposits the articles on the upstream end of the article discharge conveyor;
advancing the trays downwardly in an upstream-to-downstream direction below the articles on a tray transport member extending from the downstream end of the supply conveyor;
wherein the downstream end of the supply conveyor and the upstream end of the mass flow conveyor are at generally the same elevation, and wherein the trays are positioned below the upstream end of the mass flow conveyor as the articles are deposited on the upstream end of the article discharge conveyor by the article transfer member.

9. The method of claim 8, wherein the article transport member comprises a vacuum conveyor having a vacuum belt that acts on the upper ends of the articles to suspend the articles therebelow.

10. The method of claim 9, wherein the vacuum belt has a lower run defining an upstream end area that overlaps the downstream end of the article supply conveyor and a downstream end area that overlaps the upstream end of the discharge conveyor.

11. The method of claim 10, wherein the vacuum conveyor includes a vacuum chamber, and wherein the vacuum conveyor belt defines an inner surface exposed to an interior defined by the vacuum chamber and exposed to negative air pressure therein, a downwardly facing outer surface, and passages that communicate negative air pressure from the inner surface to the outer surface, wherein the negative air pressure communicated to the outer surface of the vacuum conveyor belt applies suction to the upper ends of the articles to suspend the articles from the vacuum conveyor belt.

12. The method of claim 8, wherein the tray transport member comprises a tray transport conveyor having a downward incline in an upstream-to-downstream direction, wherein a space is defined between the tray transport member and the upstream end of the discharge conveyor through which the trays pass after the articles have been removed from the trays.

13. The method of claim 12, wherein the tray transport conveyor defines an upstream end located adjacent the downstream end of the supply conveyor, and a downstream end located below the upstream end of the discharge conveyor, and further comprising a tray discharge conveyor located below the discharge conveyor and configured to receive trays discharged by the tray transport conveyor.

14. The method of claim 8, wherein the supply conveyor advances the articles in an upstream-to-downstream linear direction toward the downstream end of the supply conveyor, and wherein the discharge conveyor advances the articles in the upstream-to-downstream linear direction away from the upstream end of the discharge conveyor, and wherein the article transport member advances the articles in the upstream-to-downstream direction between the downstream end of the supply conveyor and the upstream end of the discharge conveyor.

* * * * *